United States Patent
Aikawa et al.

(10) Patent No.: US 12,506,500 B2
(45) Date of Patent: Dec. 23, 2025

(54) RADIO FREQUENCY MODULE AND COMMUNICATION DEVICE

(71) Applicant: Murata Manufacturing Co., Ltd., Nagaokakyo (JP)

(72) Inventors: Kiyoshi Aikawa, Nagaokakyo (JP); Hiromichi Kitajima, Nagaokakyo (JP); Takashi Yamada, Nagaokakyo (JP); Yoshihiro Daimon, Nagaokakyo (JP); Takanori Uejima, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 323 days.

(21) Appl. No.: 18/474,279

(22) Filed: Sep. 26, 2023

(65) Prior Publication Data

US 2024/0014834 A1 Jan. 11, 2024

Related U.S. Application Data

(63) Continuation of application No. PCT/JP2022/010819, filed on Mar. 11, 2022.

(30) Foreign Application Priority Data

Mar. 31, 2021 (JP) .................. 2021-060099

(51) Int. Cl.
*H04B 1/52* (2015.01)
*H04B 1/00* (2006.01)
*H04B 1/036* (2006.01)

(52) U.S. Cl.
CPC ........... *H04B 1/036* (2013.01); *H04B 1/0078* (2013.01)

(58) Field of Classification Search
CPC ........ H04B 1/036; H04B 1/0078; H04B 1/00; H04B 1/38; H01L 25/00; H03F 3/24; H05K 3/46

(Continued)

(56) References Cited

U.S. PATENT DOCUMENTS

2003/0107459 A1* 6/2003 Takahashi ............. H01P 1/2088
    333/230
2014/0060897 A1* 3/2014 Davidsson ............... H04B 1/00
    174/252

(Continued)

FOREIGN PATENT DOCUMENTS

JP 2002-359327 A 12/2002
JP 2005-203633 A 7/2005

(Continued)

OTHER PUBLICATIONS

International Search Report and Written Opinion mailed on Jun. 14, 2022, received for PCT Application PCT/JP2022/010819, filed on Mar. 11, 2022, 9 pages including English Translation.

*Primary Examiner* — Tanmay K Shah
(74) *Attorney, Agent, or Firm* — XSENSUS LLP

(57) ABSTRACT

A radio frequency module includes a module substrate having a first main surface facing a second main surface, and a module substrate having a third main surface facing a fourth main surface. The third main surface faces the second main surface. Multiple electronic components, including a power amplifier, are disposed between the second and third main surfaces on the first main surface, and on the fourth main surface. Multiple external connection terminals are disposed on the third main surface. The power amplifier has a fifth main surface facing a sixth main surface and includes a circuit portion formed nearer to the fifth main surface than the sixth main surface and includes an amplifier transistor. in the power amplifier, the fifth main surface faces the third main surface, and the sixth main surface faces the second main surface. A heat dissipation conductor is joined to the main surface.

19 Claims, 5 Drawing Sheets

(58) Field of Classification Search
USPC .................................................... 455/552.1
See application file for complete search history.

(56) References Cited

U.S. PATENT DOCUMENTS

| | | | | |
|---|---|---|---|---|
| 2019/0378801 | A1* | 12/2019 | Leitgeb | H01Q 1/526 |
| 2021/0311245 | A1* | 10/2021 | Hasegawa | G02B 6/0068 |
| 2021/0320250 | A1* | 10/2021 | Heiss | H10N 70/823 |
| 2021/0359387 | A1* | 11/2021 | Hartner | H01Q 1/2283 |

FOREIGN PATENT DOCUMENTS

| | | |
|---|---|---|
| JP | 2021-048567 A | 3/2021 |
| WO | 2019/244816 A1 | 12/2019 |
| WO | 2020/022180 A1 | 1/2020 |
| WO | 2020/071021 A1 | 4/2020 |
| WO | 2020/090557 A1 | 5/2020 |

\* cited by examiner

RADIO FREQUENCY MODULE AND COMMUNICATION DEVICE

CROSS-REFERENCE TO RELATED APPLICATIONS

This application is a continuation of international application no. PCT/JP2022/010819, filed Mar. 11, 2022, which claims priority to Japanese application no. 2021-060099, filed Mar. 31, 2021. The entire contents of both prior applications are hereby incorporated by reference.

TECHNICAL FIELD

The present disclosure relates to a radio frequency module and a communication device.

BACKGROUND ART

As for mobile communication devices such as cellular phones, radio frequency front end modules are increasingly complicated particularly due to development in support of a multi-band. For example, a technique for decreasing the size of a radio frequency module by using two module substrates has been presented.

CITATION LIST

Patent Document

Patent Document 1: International Publication No. 2020/022180

SUMMARY

Technical Problem

As for the technique described above, however, the mounting density of electronic components that are included in the radio frequency module increases as the size of the radio frequency module decreases, and accordingly, radio frequency characteristics are degraded due to an increase in the temperature of an electronic component adjacent to a high-output power amplifier.

In view of this, the present disclosure provides a radio frequency module and a communication device that have a decreased size and that improve the heat dissipation of a power amplifier.

Solution to Problem

A radio frequency module according to an exemplary aspect of the present disclosure includes a first module substrate that has a first main surface facing a second main surface, a second module substrate that has a third main surface facing a fourth main surface, the third main surface facing the second main surface, multiple electronic components that are disposed between the second main surface and the third main surface, on or along the first main surface, and on or along the fourth main surface, and multiple external connection terminals that are disposed on or along the fourth main surface. The multiple electronic components include a power amplifier. The power amplifier has a fifth main surface facing a sixth main surface and includes a circuit portion that is formed nearer than the sixth main surface to the fifth main surface and that includes an amplifier transistor. As for the power amplifier, the fifth main surface faces the third main surface, and the sixth main surface faces the second main surface. A heat dissipation conductor is joined to the fifth main surface.

A radio frequency module according to an exemplary aspect of the present disclosure includes a module substrate that has a first main surface facing a second main surface, multiple electronic components that are disposed on or along the first main surface and the second main surface, multiple external connection terminals that are disposed on or along the second main surface, and a power amplifier that is disposed in the module substrate. The power amplifier has a third main surface facing a fourth main surface and includes a circuit portion that is formed nearer than the fourth main surface to the third main surface and that includes an amplifier transistor. As for the power amplifier, the third main surface is nearer than the fourth main surface to the second main surface. A heat dissipation conductor is joined to the third main surface.

Advantageous Effects

A radio frequency module according to an exemplary aspect of the present disclosure has a decreased size and can improve the heat dissipation of a power amplifier.

DETAILED DESCRIPTION

Figure 1:
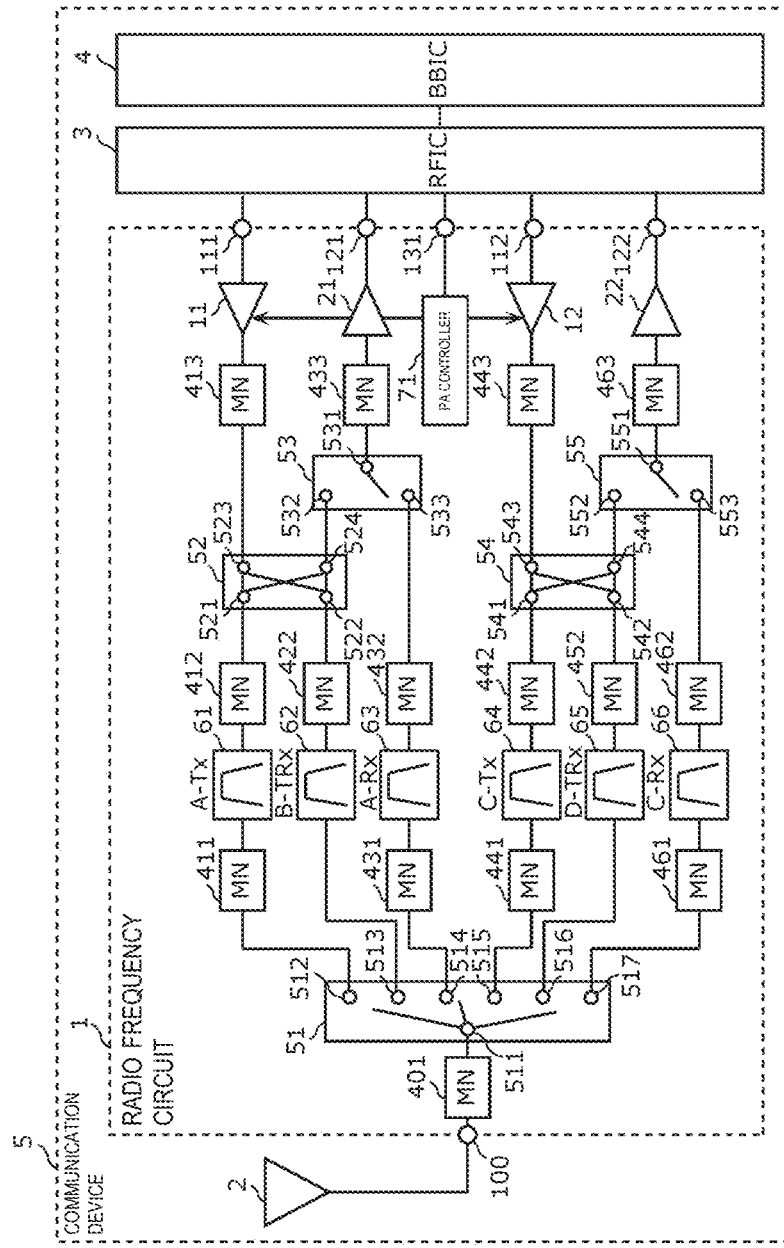
FIG. 1 is a circuit diagram of a radio frequency circuit and a communication device according to an exemplary embodiment.

An exemplary embodiment of the present disclosure will hereinafter be described in detail with reference to the drawings. The exemplary embodiment is comprehensively or specifically described below. In the following exemplary embodiment, numerical values, shapes, materials, components, and the arrangement and connection form of the components, for example, are described by way of example and do not limit the present disclosure.

The drawings are schematically illustrated to describe the present disclosure so as to appropriately include emphasis, omission, adjustment in a ratio and are not necessarily strictly illustrated, and some shapes, positional relationships, and ratios differ from actual ones. In the drawings, substantially like components are designated by using like reference signs, and a duplicated description is omitted or simplified in some cases.

In the drawings described below, an x-axis and a y-axis are perpendicular to each other along a plane parallel with a main surface of a module substrate. Specifically, in the case where the module substrate has a rectangular shape in a plan view, the x-axis is parallel with a first side of the module substrate, and the y-axis is parallel with a second side of the module substrate perpendicular to the first side. A z-axis is perpendicular to the main surface of the module substrate, a positive direction thereof represents an upward direction, and a negative direction thereof represents a downward direction.

As for a circuit structure according to the present disclosure, the case of "being connected" includes not only the case of being directly connected by using a connection terminal and/or a wiring conductor but also the case of being electrically connected with another circuit element interposed therebetween. The expression "connected between A and B" means being connected to both of A and B between A and B, and the meaning thereof includes not only being connected in series on a path that connects A and B to each other but also being connected in parallel between the path and the ground (shunt connection).

As for the arrangement of components according to the present disclosure, a "plan view" means that an object orthographically projected on an xy plane is viewed from a positive position on the z-axis. The expression "A overlaps B in a plan view" means that the region of A orthographically projected on the xy plane overlaps the region of B orthographically projected on the xy plane. The expression "A is disposed between B and C" means that at least one of multiple lines that connect a freely selected point in B and a freely selected point in C to each other passes through A. The expression "A is joined to B" means that A is physically connected to B. Terms that represent relationships between elements such as "parallel" and "perpendicular", and a term that represents the shape of an element such as "rectangular", and a numeral range do not have only strict meanings but have substantially the same meanings including, for example, an error of about several percent.

As for the arrangement of the components according to the present disclosure, the expression "a component is disposed in, on, or along a substrate" means that the component is disposed on or along a main surface of the substrate or that the component is disposed in the substrate. The expression "a component is disposed on or along a main surface of a substrate" means that the component is in contact with the main surface of the substrate or that the component is not in contact with the main surface but is disposed along the main surface (for example, the component is stacked on another component that is in contact with the main surface). The expression "a component is disposed on or along a main surface of a substrate" may mean that the component is disposed in a recessed portion that is formed on the main surface. The expression "a component is disposed in a substrate" means that the component is encapsulated in a module substrate, that the entire component is disposed between both main surfaces of the substrate but a part of the component is not covered by the substrate, or that only a part of the component is disposed in the substrate. The expression "a component is disposed between two main surfaces" means that the component is disposed so as to be in contact with both of the two main surfaces, that the component is disposed so as to be in contact with one of the two main surfaces, or that the component is disposed so as not to be in contact with the two main surfaces.

Embodiment

1 Circuit Structures of Radio Frequency Circuit 1 and Communication Device 5

The circuit structures of a radio frequency circuit 1 and a communication device 5 according to the exemplary embodiment will be described with reference to FIG. 1. FIG. 1 is a circuit diagram of the radio frequency circuit 1 and the communication device 5 according to the exemplary embodiment.

1.1 Circuit Structure of Communication Device 5

The circuit structure of the communication device 5 will now be described. As illustrated in FIG. 1, the communication device 5 according to the exemplary embodiment includes the radio frequency circuit 1, an antenna 2, a RFIC (Radio Frequency Integrated Circuit) 3, and a BBIC (Baseband Integrated Circuit) 4.

The radio frequency circuit 1 transmits a radio frequency signal between the antenna 2 and the RFIC 3. An inner structure of the radio frequency circuit 1 will be described later.

The antenna 2 is connected to an antenna connection terminal 100 in the radio frequency circuit 1, transmits a radio frequency signal that is outputted from the radio frequency circuit 1, and outputs a radio frequency signal that is received from the outside to the radio frequency circuit 1.

The RFIC 3 is an example of a signal processing circuit that processes a radio frequency signal. Specifically, the RFIC 3 processes a radio frequency reception signal that is inputted via a reception path in the radio frequency circuit 1 by using, for example, down-converting and outputs a reception signal that is thus processed and generated to the BBIC 4. The RFIC 3 processes a transmission signal that is inputted from the BBIC 4 by using, for example, up-converting and outputs a radio frequency transmission signal that is thus processed and generated to a transmission path in the radio frequency circuit 1. The RFIC 3 includes a controller that controls, for example, switches and amplifiers that are included in the radio frequency circuit 1. A part or the whole of the function of the controller of the RFIC 3 may be performed outside the RFIC 3 and may be performed by, for example, the BBIC 4 or the radio frequency circuit 1.

The BBIC 4 is a baseband signal processing circuit that processes a signal by using an intermediate frequency band lower than that of a radio frequency signal that is transmitted by the radio frequency circuit 1. Examples of the signal that is processed by the BBIC 4 include an image signal for image display and/or an audio signal for telecommunication via a speaker.

As for the communication device 5 according to the exemplary embodiment, the antenna 2 and the BBIC 4 are not essential components.

1.2 Circuit Structure of Radio Frequency Circuit 1

The circuit structure of the radio frequency circuit 1 will now be described. As illustrated in FIG. 1, the radio frequency circuit 1 includes power amplifiers (PA) 11 and 12, low-noise amplifiers (LNA) 21 and 22, matching circuits (MN) 401, 411 to 413, 422, 431 to 433, 441 to 443, 452, and 461 to 463, switches (SW) 51 to 55, filters 61 to 66, a PA controller (PAC) 71, the antenna connection terminal 100, radio frequency input terminals 111 and 112, radio frequency output terminals 121 and 122, and a control terminal 131. The components of the radio frequency circuit 1 will now be sequentially described.

The antenna connection terminal 100 is connected to the antenna 2 outside the radio frequency circuit 1.

The radio frequency input terminals 111 and 112 receive a radio frequency transmission signal from a location outside the radio frequency circuit 1. According to the exemplary embodiment, the radio frequency input terminals 111 and 112 are connected to the RFIC 3 outside the radio frequency circuit 1.

The radio frequency output terminals 121 and 122 provide a radio frequency reception signal to a location outside the radio frequency circuit 1. According to the exemplary embodiment, the radio frequency output terminals 121 and 122 are connected to the RFIC 3 outside the radio frequency circuit 1.

The control terminal 131 transmits a control signal. That is, the control terminal 131 receives a control signal from a location outside the radio frequency circuit 1 and/or provides a control signal to a location outside the radio frequency circuit 1. A control signal is a signal regarding control of an electronic circuit that is included in the radio frequency circuit 1. Specifically, an example of the control signal is a digital signal for controlling at least one selected from the power amplifiers 11 and 12, the low-noise amplifiers 21 and 22, and the switches 51 to 55.

The power amplifier 11 is connected between the radio frequency input terminal 111 and the filter 61 and between the radio frequency input terminal 111 and the filter 62 and can amplify transmission signals in bands A and B. Specifically, an input end of the power amplifier 11 is connected to the radio frequency input terminal 111. An output end of the power amplifier 11 is connected to the filter 61 with the matching circuit 413, the switch 52, and the matching circuit 412 interposed therebetween. The output end of the power amplifier 11 is connected to the filter 62 with the matching circuit 413, the switch 52, and the matching circuit 422 interposed therebetween.

The power amplifier 12 is connected between the radio frequency input terminal 112 and the filter 64 and between the radio frequency input terminal 112 and the filter 65 and can amplify transmission signals in bands C and D. Specifically, an input end of the power amplifier 12 is connected to the radio frequency input terminal 112. An output end of the power amplifier 12 is connected to the filter 64 with the matching circuit 443, the switch 54, and the matching circuit 442 interposed therebetween. The output end of the power amplifier 12 is connected to the filter 65 with the matching circuit 443, the switch 54, and the matching circuit 452 interposed therebetween.

The power amplifiers 11 and 12 are electronic components that acquire an output signal that has energy higher than that of an input signal (a transmission signal), based on power that is supplied from a power source. The power amplifiers 11 and 12 include respective amplifier transistors and may further include respective inductors and/or capacitors. Inner structures of the power amplifiers 11 and 12 are not particularly limited. For example, the power amplifiers 11 and 12 may be multistage amplifiers, differential amplifiers, or Doherty amplifiers.

The low-noise amplifier 21 is connected between the filter 62 and the radio frequency output terminal 121 and between the filter 63 and the radio frequency output terminal 121 and can amplify reception signals in the bands A and B. Specifically, an input end of the low-noise amplifier 21 is connected to the filter 62 with the matching circuit 433, the switches 53 and 52, and the matching circuit 422 interposed therebetween. The input end of the low-noise amplifier 21 is connected to the filter 63 with the matching circuit 433, the switch 53, and the matching circuit 432 interposed therebetween. An output end of the low-noise amplifier 21 is connected to the radio frequency output terminal 121.

The low-noise amplifier 22 is connected between the filter 65 and the radio frequency output terminal 122 and between the filter 66 and the radio frequency output terminal 122 and can amplify reception signals in the bands C and D. Specifically, an input end of the low-noise amplifier 22 is connected to the filter 65 with the matching circuit 463, the switches 55 and 54, and the matching circuit 452 interposed therebetween. The input end of the low-noise amplifier 22 is connected to the filter 66 with the matching circuit 463, the switch 55, and the matching circuit 462 interposed therebetween. An output end of the low-noise amplifier 22 is connected to the radio frequency output terminal 122.

The low-noise amplifiers 21 and 22 are electronic components that acquire an output signal that has energy higher than that of an input signal (a reception signal), based on power that is supplied from a power source. The low-noise amplifiers 21 and 22 include respective amplifier transistors and may further include respective inductors and/or capacitors. Inner structures of the low-noise amplifiers 21 and 22 are not particularly limited.

The matching circuits 401, 411 to 413, 422, 431 to 433, 441 to 443, 452, and 461 to 463 are connected between two circuit elements and can match impedance between the two circuit elements. That is, the matching circuits 401, 411 to 413, 422, 431 to 433, 441 to 443, 452, and 461 to 463 are impedance matching circuits. The matching circuits 401, 411 to 413, 422, 431 to 433, 441 to 443, 452, and 461 to 463 include respective inductors and may further include respective capacitors.

The matching circuit 411 is connected between the switch 51 and the filter 61. The matching circuit 431 is connected between the switch 51 and the filter 63. The matching circuit 441 is connected between the switch 51 and the filter 64. The matching circuit 461 is connected between the switch 51 and the filter 66.

The matching circuit 412 is connected between the power amplifier 11 and the filter 61. The matching circuit 413 is connected between the power amplifier 11 and the filter 61 and between the power amplifier 11 and the filter 62. The matching circuit 442 is connected between the power amplifier 12 and the filter 64. The matching circuit 443 is connected between the power amplifier 12 and the filter 64 and between the power amplifier 12 and the filter 65.

The matching circuit 401 is connected between the antenna connection terminal 100 and the switch 51.

The matching circuit 432 is connected between the low-noise amplifier 21 and the filter 63. The matching circuit 433 is connected between the low-noise amplifier 21 and the filter 63. The matching circuit 462 is connected between the low-noise amplifier 22 and the filter 66. The matching circuit 463 is connected between the low-noise amplifier 22 and the filter 66.

The switch 51 is connected between the antenna connection terminal 100 and the filters 61 to 66. The switch 51 includes terminals 511 to 517. The terminal 511 is connected to the antenna connection terminal 100. The terminal 512 is connected to the filter 61 with the matching circuit 411 interposed therebetween. The terminal 513 is connected to the filter 62. The terminal 514 is connected to the filter 63 with the matching circuit 431 interposed therebetween. The terminal 515 is connected to the filter 64 with the matching circuit 441 interposed therebetween. The terminal 516 is connected to the filter 65. The terminal 517 is connected to the filter 66 with the matching circuit 461 interposed therebetween.

With this structure for connection, the switch 51 can connect the terminal 511 to at least one of the terminals 512 to 517, for example, based on a control signal from the RFIC 3. That is, the switch 51 can switch connection and disconnection between the antenna connection terminal 100 and the filters 61 to 66. For example, the switch 51 includes a multiconnection switch circuit and is referred to as an antenna switch in some cases.

The switch 52 is connected between the output end of the power amplifier 11 and the filter 61 and between the output end of the power amplifier 11 and the filter 62 and is connected between the input end of the low-noise amplifier 21 and the filter 62. The switch 52 includes terminals 521 to 524. The terminal 521 is connected to the filter 61 with the matching circuit 412 interposed therebetween. The terminal 522 is connected to the filter 62 with the matching circuit 422 interposed therebetween. The terminal 523 is connected to the output end of the power amplifier 11 with the matching circuit 413 interposed therebetween. The terminal 524 is connected to the input end of the low-noise amplifier 21 with the switch 53 and the matching circuit 433 interposed therebetween.

With this structure for connection, the switch 52 can connect the terminal 523 to at least the terminal 521 or 522, for example, based on a control signal from the RFIC 3 and can connect the terminal 522 to the terminal 523 or 524. That is, the switch 52 can switch connection and disconnection between the power amplifier 11 and the filter 61 and between the power amplifier 11 and the filter 62 and can change the connection destination of the filter 62 between the power amplifier 11 and the low-noise amplifier 21. For example, the switch 52 includes a multiconnection switch circuit.

The switch 53 is connected between the input end of the low-noise amplifier 21 and the filter 62 and between the input end of the low-noise amplifier 21 and the filter 63. The switch 53 includes terminals 531 to 533. The terminal 531 is connected to the input end of the low-noise amplifier 21 with the matching circuit 433 interposed therebetween. The terminal 532 is connected to the terminal 524 of the switch 52 and is connected to the filter 62 with the switch 52 and the matching circuit 422 interposed therebetween. The terminal 533 is connected to the filter 63 with the matching circuit 432 interposed therebetween.

With this structure for connection, the switch 53 can connect the terminal 531 to at least the terminal 532 or 533, for example, based on a control signal from the RFIC 3. That is, the switch 53 can switch connection and disconnection between the low-noise amplifier 21 and the filter 62 and between the low-noise amplifier 21 and the filter 63. For example, the switch 53 includes a multiconnection switch circuit.

The switch 54 is connected between the output end of the power amplifier 12 and the filter 64 and between the output end of the power amplifier 12 and the filter 65 and is connected between the input end of the low-noise amplifier 22 and the filter 65. The switch 54 includes terminals 541 to 544. The terminal 541 is connected to the filter 64 with the matching circuit 442 interposed therebetween. The terminal 542 is connected to the filter 65 with the matching circuit 452 interposed therebetween. The terminal 543 is connected to the output end of the power amplifier 12 with the matching circuit 443 interposed therebetween. The terminal 544 is connected to the input end of the low-noise amplifier 22 with the switch 55 and the matching circuit 463 interposed therebetween.

With this structure for connection, the switch 54 can connect the terminal 543 to at least the terminal 541 or 542, for example, based on a control signal from the RFIC 3 and can connect the terminal 542 to the terminal 543 or 544. That is, the switch 54 can switch connection and disconnection between the power amplifier 12 and the filter 64 and between the power amplifier 12 and the filter 65 and can change the connection destination of the filter 65 between the power amplifier 12 and the low-noise amplifier 22. For example, the switch 54 includes a multiconnection switch circuit.

The switch 55 is connected between the input end of the low-noise amplifier 22 and the filter 65 and between the input end of the low-noise amplifier 22 and the filter 66. The switch 55 includes terminals 551 to 553. The terminal 551 is connected to the input end of the low-noise amplifier 22 with the matching circuit 463 interposed therebetween. The terminal 552 is connected to the terminal 544 of the switch 54 and is connected to the filter 65 with the switch 54 and the matching circuit 452 interposed therebetween. The terminal 553 is connected to the filter 66 with the matching circuit 462 interposed therebetween.

With this structure for connection, the switch 55 can connect the terminal 551 to at least the terminal 552 or 553, for example, based on a control signal from the RFIC 3. That is, the switch 55 can switch connection and disconnection between the low-noise amplifier 22 and the filter 65 and between the low-noise amplifier 22 and the filter 66. For example, the switch 55 includes a multiconnection switch circuit.

The filter 61 (A-Tx) is connected between the power amplifier 11 and the antenna connection terminal 100. Specifically, an end of the filter 61 is connected to the antenna connection terminal 100 with the matching circuit 411, the switch 51, and the matching circuit 401 interposed therebetween. Another end of the filter 61 is connected to the output end of the power amplifier 11 with the matching circuit 412, the switch 52, and the matching circuit 413 interposed therebetween. The filter 61 has a pass band that includes an uplink operation band in the band A for frequency division duplex (FDD) and enables a transmission signal in the band A to pass.

The filter 62 (B-TRx) is connected between the antenna connection terminal 100 and the power amplifier 11 and is connected between the antenna connection terminal 100 and the low-noise amplifier 21. Specifically, an end of the filter 62 is connected to the antenna connection terminal 100 with the switch 51 and the matching circuit 401 interposed therebetween. Another end of the filter 62 is connected to the output end of the power amplifier 11 with the matching circuit 422, the switch 52, and the matching circuit 413 interposed therebetween and is connected to the input end of the low-noise amplifier 21 with the matching circuit 422, the switches 52 and 53, and the matching circuit 433 interposed therebetween. The filter 62 has a pass band that includes the band B for time division duplex (TDD) and enables a transmission signal and a reception signal in the band B to pass.

The filter 63 (A-Rx) is connected between the low-noise amplifier 21 and the antenna connection terminal 100. Specifically, an end of the filter 63 is connected to the antenna connection terminal 100 with the matching circuit 431, the switch 51, and the matching circuit 401 interposed therebetween. Another end of the filter 63 is connected to the input end of the low-noise amplifier 21 with the matching circuit 432, the switch 53, and the matching circuit 433 interposed therebetween. The filter 63 has a pass band that includes a downlink operation band in the band A for FDD and enables a reception signal in the band A to pass.

The filter 64 (C-Tx) is connected between the power amplifier 12 and the antenna connection terminal 100. Specifically, an end of the filter 64 is connected to the antenna connection terminal 100 with the matching circuit 441, the switch 51, and the matching circuit 401 interposed therebetween. Another end of the filter 64 is connected to the output end of the power amplifier 12 with the matching circuit 442, the switch 54, and the matching circuit 443 interposed therebetween. The filter 64 has a pass band that includes an uplink operation band in the band C for FDD and enables a transmission signal in the band C to pass.

The filter 65 (D-TRx) is connected between the antenna connection terminal 100 and the power amplifier 12 and is connected between the antenna connection terminal 100 and the low-noise amplifier 22. Specifically, an end of the filter 65 is connected to the antenna connection terminal 100 with the switch 51 and the matching circuit 401 interposed therebetween. Another end of the filter 65 is connected to the output end of the power amplifier 12 with the matching circuit 452, the switch 54, and the matching circuit 443 interposed therebetween, and is connected to the input end of the low-noise amplifier 22 with the matching circuit 452, the switches 54 and 55, and the matching circuit 463 interposed therebetween. The filter 65 has a pass band that includes the band D for TDD and enables a transmission signal and a reception signal in the band D to pass.

The filter 66 (C-Rx) is connected between the low-noise amplifier 22 and the antenna connection terminal 100. Specifically, an end of the filter 66 is connected to the antenna connection terminal 100 with the matching circuit 461, the switch 51, and the matching circuit 401 interposed therebetween. Another end of the filter 66 is connected to the input end of the low-noise amplifier 22 with the matching circuit 462, the switch 55, and the matching circuit 463 interposed therebetween. The filter 66 has a pass band that includes a downlink operation band in the band C for FDD and enables a reception signal in the band C to pass.

The PA controller 71 can control the power amplifiers 11 and 12. The PA controller 71 receives a digital control signal from the RFIC 3 via the control terminal 131 and outputs a control signal to the power amplifiers 11 and 12. The PA controller 71 may output a control signal to the switches 51 to 55 and may control the switches 51 to 55.

The bands A to D are frequency bands for a communication system that is built by using radio access technology (RAT). The bands A to D are defined by, for example, standards organizations (such as 3GPP (3rd Generation Partnership Project) and IEEE (Institute of Electrical and Electronics Engineers)) in advance. Examples of the communication system include a 5GNR (5th Generation New Radio) system, a LTE (Long Term Evolution) system, and a WLAN (Wireless Local Area Network) system.

The bands A and B and the bands C and D may belong to different band groups or may belong to the same band group. A band group means a frequency range in which multiple bands are included. Examples of the band group can include an ultra-high band group (3300 to 5000 MHz), a high band group (2300 to 2690 MHz), a middle band group (1427 to 2200 MHz), and a low band group (698 to 960 MHz) but are not limited thereto. An example of the band group may be a band group that includes an unlicensed band of 5 GHz or more or a band group of a millimeter band.

For example, the bands A and B may be included in the high band group, and the bands C and D may be included in the middle band group. For example, the bands A and B may be included in the middle band group or the high band group, and the bands C and D may be included in the low band group.

The radio frequency circuit 1 is illustrated in FIG. 1 by way of example and is not limited thereto. For example, bands that are supported by the radio frequency circuit 1 are not limited to the bands A to D. For example, the radio frequency circuit 1 may support five or more bands. In this case, the radio frequency circuit 1 may include a filter for bands E, F, G, and so on. For example, the radio frequency circuit 1 may support only the bands A and B and does not necessarily need to support the bands C and D. In this case, the radio frequency circuit 1 does not necessarily need to include the power amplifier 12, the low-noise amplifier 22, the matching circuits 441 to 443, 452, and 461 to 463, the radio frequency input terminal 112, and the radio frequency output terminal 122. For example, the radio frequency circuit 1 may be a transmit-only circuit. In this case, the radio frequency circuit 1 does not necessarily need to include the low-noise amplifiers 21 and 22, the matching circuits 431 to 433 and 461 to 463, the switches 53 and 55, the filters 63 and 66, and the radio frequency output terminals 121 and 122. For example, the radio frequency circuit 1 may be a receive-only circuit. In this case, the radio frequency circuit 1 does not necessarily need to include the power amplifiers 11 and 12, the matching circuits 411 to 413 and 441 to 443, the switches 52 and 54, the filters 61 and 64, and the radio frequency input terminals 111 and 112.

The radio frequency circuit 1 does not necessarily need to include some of the matching circuits 401, 411 to 413, 422, 431 to 433, 441 to 443, 452, and 461 to 463. For example, the radio frequency circuit 1 may be connected to multiple antennas and may include multiple antenna connection terminals. The radio frequency circuit 1 may further include an additional radio frequency input terminal. In this case, a switch that can change the connection destination of a power amplifier between multiple radio frequency input terminals may be interposed between the power amplifier and the multiple radio frequency input terminals. The radio frequency circuit 1 may further include an additional radio frequency output terminal. In this case, a switch that can change the connection destination of a low-noise amplifier between multiple radio frequency output terminals may be interposed between the low-noise amplifier and the multiple radio frequency output terminals.

2 Example of Radio Frequency Circuit 1

2.1 First Example

A radio frequency module 1A that includes the radio frequency circuit 1 will be described as a first example of the radio frequency circuit 1 according to the exemplary embodiment described above with reference to FIG. 2 to FIG. 5.

[2.1.1 Arrangement of Components of Radio Frequency Module 1A]

Figure 2:
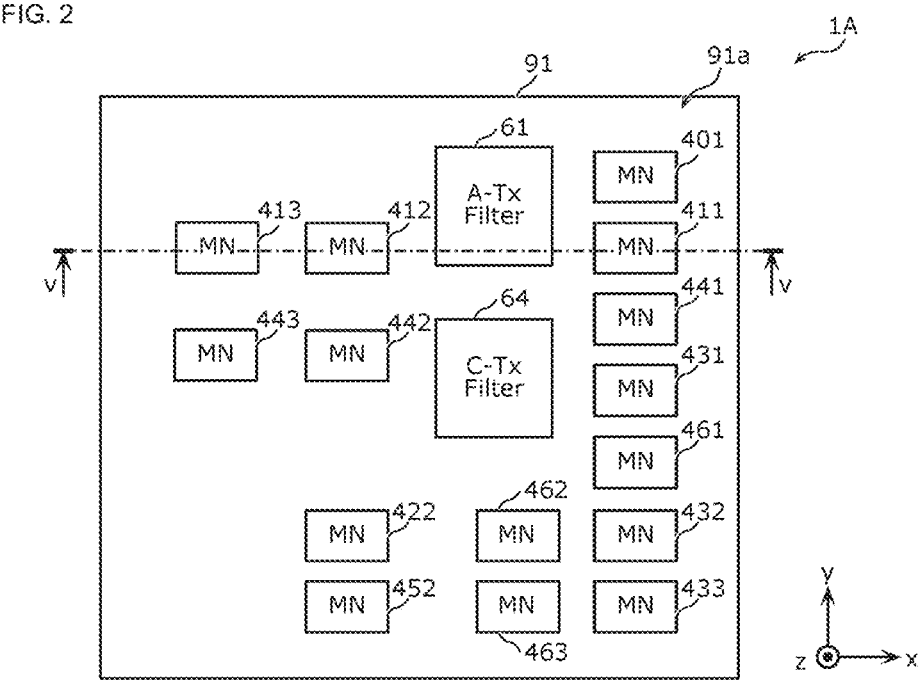
FIG. 2 is a plan view of a first main surface of a radio frequency module in a first example.
Figure 3:
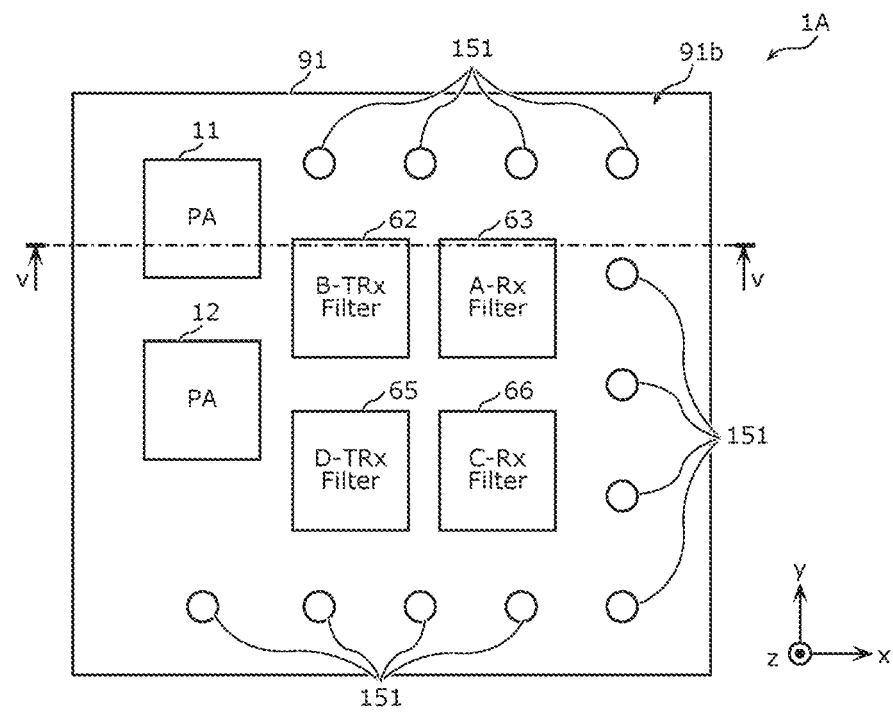
FIG. 3 is a plan view of a second main surface of the radio frequency module in the first example.
Figure 4:
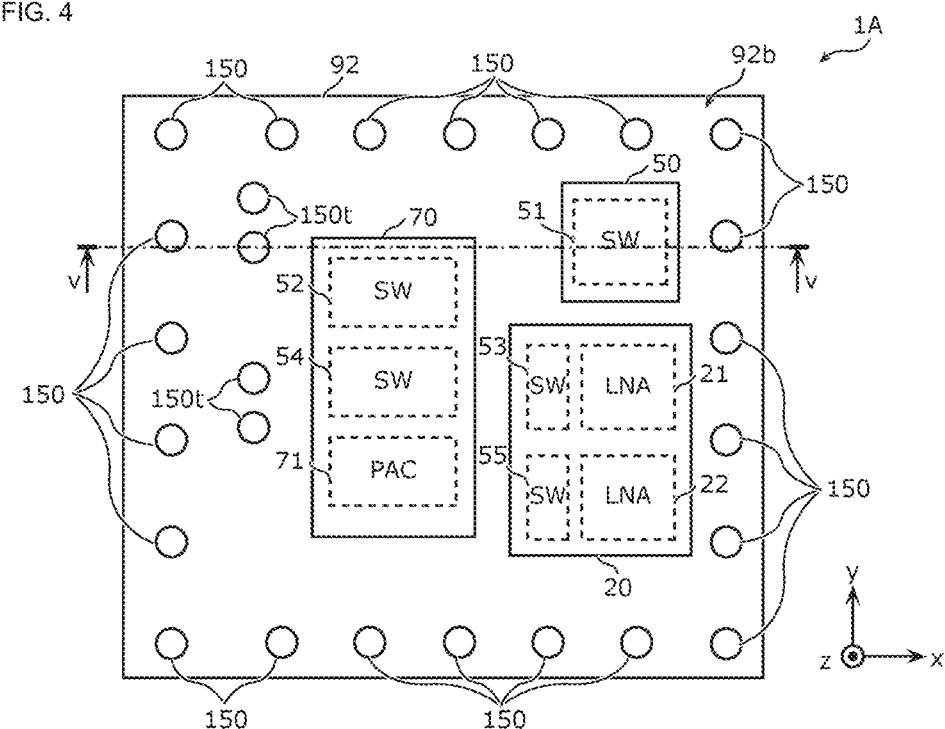
FIG. 4 is a plan view of a fourth main surface of the radio frequency module in the first example.
Figure 5:
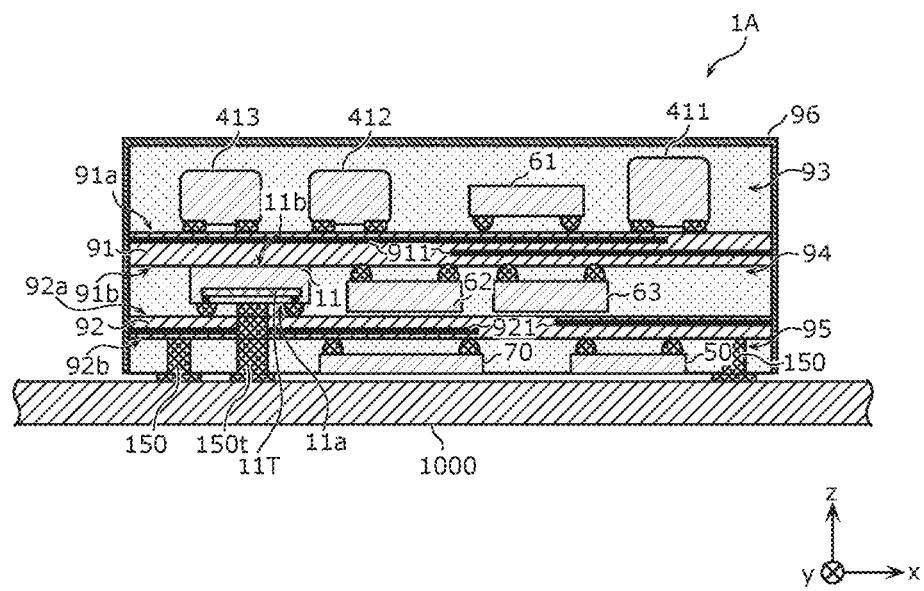
FIG. 5 is a sectional view of the radio frequency module in the first example.

FIG. 2 is a plan view of a main surface 91a of the radio frequency module 1A in the present example. FIG. 3 is a plan view of a main surface 91b of the radio frequency module 1A in the present example and illustrates the main surface 91b of a module substrate 91 viewed from a positive position on the z-axis. FIG. 4 is a plan view of a main surface 92b of the radio frequency module 1A in the present example and illustrates the main surface 92b of a module substrate 92 viewed in a positive position on the z-axis. FIG. 5 is a sectional view of the radio frequency module 1A in the present example. A section of the radio frequency module 1A in FIG. 5 is a section taken along line v-v in FIG. 2 to FIG. 4.

In FIG. 2 to FIG. 5, an illustration for wiring lines that connect multiple electronic components that are disposed in, on, or along the module substrates 91 and 92 is omitted. In FIG. 2 to FIG. 4, an illustration for resin members 93 to 95 that cover the multiple electronic components and a shield electrode layer 96 that covers surfaces of the resin members 93 to 95 is omitted.

The radio frequency module 1A includes the module substrates 91 and 92, the resin members 93 to 95, the shield electrode layer 96, multiple external connection terminals 150, multiple heat dissipation conductors 150t, and multiple inter-substrate connection terminals 151 in addition to multiple electronic components that include multiple circuit elements illustrated in FIG. 1.

The module substrate 91 is an example of a first module substrate and has the main surfaces 91a and 91b that face each other. The main surfaces 91a and 91b are examples of a first main surface and a second main surface.

The module substrate 92 is an example of a second module substrate and has a main surface 92a and the main surface 92b that face each other. The main surfaces 92a and 92b are examples of a third main surface and a fourth main surface.

The module substrates 91 and 92 are disposed such that the main surface 91b of the module substrate 91 faces the main surface 92a of the module substrate 92. The module substrates 91 and 92 are disposed so as to be separated from each other such that electronic components can be disposed between the main surfaces 91b and 92a. The multiple electronic components are disposed in, on, or along the two module substrates 91 and 92, specifically, between the main surfaces 91b and 92a, on or along the main surface 91a, and on or along the main surface 92b so as to be divided into three layers.

A ground conductor 911 that extends in parallel with the main surfaces 91a and 91b may be formed in the module substrate 91. This improves isolation between an electronic component that is disposed on or along the main surface 91a and an electronic component that is disposed on or along the main surface 91b. A ground conductor 921 that extends in parallel with the main surfaces 92a and 92b may be formed in the module substrate 92. This improves isolation between an electronic component that is disposed on or along the main surface 92a and an electronic component that is disposed on or along the main surface 92b.

In FIG. 2 to FIG. 5, the module substrates 91 and 92 have a rectangular shape having the same size in a plan view but may have different sizes and/or different shapes. The shape of the module substrates 91 and 92 is not limited to a rectangular shape.

Examples of the module substrates 91 and 92 can include a high temperature co-fired ceramic (HTCC) substrate or a low-temperature co-fired ceramic (LTCC) substrate having a multilayer structure of multiple dielectric layers, a component-containing substrate, a substrate that includes a redistribution layer (RDL), and a printed circuit board but are not limited thereto.

The matching circuits 401, 411 to 413, 422, 431 to 433, 441 to 443, 452, and 461 to 463 and the filters 61 and 64 are disposed on or along the main surface 91a (an upper layer).

For example, the matching circuits 401, 411 to 413, 422, 431 to 433, 441 to 443, 452, and 461 to 463 include respective chip inductors. Each chip inductor is a surface mount device (SMD) that is included in an inductor.

The matching circuits may include respective chip capacitors in addition to the chip inductors. The arrangement of the chip capacitors is not particularly limited. Some of the matching circuits are not necessarily surface mount circuits. For example, the inductors and/or the capacitors that are included in the matching circuits may be formed in the module substrates 91 and 92 or the module substrate 91 or 92.

Examples of the filters 61 and 64 may include a surface acoustic wave (SAW) filter, a bulk acoustic wave (BAW) filter, a LC resonance filter, and a dielectric filter but are not limited thereto.

The resin member 93 covers the main surface 91a and electronic components on or along the main surface 91a. The resin member 93 has a function of ensuring the reliability of, for example, the mechanical strength and humidity resistance of the electronic components on or along the main surface 91a. The radio frequency module 1A does not necessarily need to include the resin member 93.

The power amplifiers 11 and 12, the filters 62, 63, 65, and 66, and the multiple inter-substrate connection terminals 151 are disposed between the main surfaces 91b and 92a (an intermediate layer). The resin member 94 is injected between the main surfaces 91b and 92a and covers the electronic components that are disposed between the main surfaces 91b and 92a.

The power amplifiers 11 and 12 include the respective amplifier transistors. The amplifier transistor of the power amplifier 11 is formed at a circuit portion 11T. As illustrated in FIG. 5, the circuit portion 11T is formed near a main surface 11a of the main surface 11a (a fifth main surface) and a main surface 11b (a sixth main surface) of the power amplifier 11 that face each other. As for the power amplifier 11, the main surface 11a faces the main surface 92a, and the main surface 11b faces the main surface 91b. Similarly, the amplifier transistor that is included in the power amplifier 12 is formed at a circuit portion 12T. The circuit portion 12T is formed near a main surface 12a of the main surface 12a (the fifth main surface) and a main surface 12b (the sixth main surface) of the power amplifier 12 that face each other although this is not illustrated. As for the power amplifier 12, the main surface 12a faces the main surface 92a, and the main surface 12b faces the main surface 91b. The power amplifiers 11 and 12 are electrically connected to the module substrate 92 with electrodes that face the module substrate 92 interposed therebetween.

For example, the power amplifiers 11 and 12 are composed of a CMOS (Complementary Metal Oxide Semiconductor) and may be specifically manufactured in a SOI (Silicon on Insulator) process. This enables the power amplifiers 11 and 12 to be manufactured at low costs. The power amplifiers 11 and 12 may be composed of at least gallium arsenide (GaAs), silicon germanium (SiGe), or gallium nitride (GaN). This enables the power amplifiers 11 and 12 to have high quality. A semiconductor material for the power amplifiers 11 and 12 is not limited to the materials described above.

Examples of the filters 62, 63, 65, and 66 may include a SAW filter, a BAW filter, a LC resonance filter, and a dielectric filter but are not limited thereto. The filters 62, 63, 65, and 66 are electrically connected to the module substrate 91 with electrodes that face the module substrate 91 interposed therebetween.

In a plan view of the module substrate 91, the matching circuit 413 (a first electronic component) and the power amplifier 11 at least partly overlap. The matching circuit 443 (the first electronic component) and the power amplifier 12 at least partly overlap. In the plan view described above, the first electronic component that at least partly overlaps the power amplifier 11 or 12 may be any one of the multiple electronic components that are disposed on or along the main surface 91a.

The multiple inter-substrate connection terminals 151 are electrodes for electrically connecting the module substrates 91 and 92. Examples of the inter-substrate connection terminals 151 include a copper post electrode, but shapes and materials are not limited thereto.

The resin member 94 covers the main surfaces 91b and 92a and the electronic components between the main surfaces 91b and 92a. The resin member 94 has a function of ensuring the reliability of, for example, the mechanical strength and humidity resistance of the electronic components between the main surfaces 91b and 92a. The radio frequency module 1A does not necessarily need to include the resin member 94.

Integrated circuits 20, 50, and 70, the multiple external connection terminals 150, and the multiple heat dissipation conductors 150t are disposed on or along the main surface 92b (a lower layer).

The multiple heat dissipation conductors 150t overlap the power amplifiers 11 and 12 in a plan view and function as the heat dissipation electrodes of the power amplifiers 11 and 12. More specifically, as for each of the multiple heat dissipation conductors 150t, as illustrated in FIG. 4 and FIG. 5, an end is joined to the main surface 11a of the power amplifier 11 or the main surface 12a of the power amplifier 12 and extends in a direction toward the main surface 92b from the main surface 92a (the negative direction of the z-axis), and anther end is exposed from the bottom surface of the resin member 95 and is joined to a motherboard 1000 with at least a metal electrode or solder interposed therebetween. This enables the heat dissipation of the power amplifiers 11 and 12 to be improved. Examples of the heat dissipation conductors 150t include a via conductor that has a circular or elliptic section parallel with the module substrate 91 and a copper post electrode, but shapes and materials are not limited thereto.

The integrated circuit 20 includes the low-noise amplifiers 21 and 22 and the switches 53 and 55. Circuit elements that are included in the low-noise amplifiers 21 and 22 and the switches 53 and 55 are formed on or along a circuit surface of the integrated circuit 20. An example of the circuit surface is a main surface of the integrated circuit 20 that faces the module substrate 92. The integrated circuit 70 includes the switches 52 and 54 and the PA controller 71. Circuit elements that are included in the switches 52 and 54 and the PA controller 71 are formed on or along a circuit surface of the integrated circuit 70. An example of the circuit surface is a main surface of the integrated circuit 70 that faces the module substrate 92. The integrated circuit 50 includes the switch 51. The switch 51 may be included in the integrated circuit 20 or 70.

For example, the integrated circuits 20, 50, and 70 are composed of a CMOS and may be specifically manufactured in a SOI process. The integrated circuits 20, 50, and 70 may be composed of at least GaAs, SiGe, or GaN. A semiconductor material for the integrated circuits 20, 50, and 70 is not limited to the materials described above.

The multiple external connection terminals 150 include a ground terminal in addition to the antenna connection terminal 100, the radio frequency input terminals 111 and 112, the radio frequency output terminals 121 and 122, and the control terminal 131 illustrated in FIG. 1. The multiple external connection terminals 150 are joined to, for example, input and output terminals and/or a ground terminal on or along the motherboard 1000 that is disposed at a negative position on the z-axis of the radio frequency module 1A. Examples of the multiple external connection terminals 150 can include a copper post electrode, but shapes and materials are not limited thereto.

The resin member 95 covers the main surface 92b and the electronic components on or along the main surface 92b. The resin member 95 has a function of ensuring the reliability of, for example, the mechanical strength and humidity resistance of the electronic components on or along the main surface 92b. The radio frequency module 1A does not necessarily need to include the resin member 95.

The shield electrode layer 96 is a metal thin film that is formed by, for example, a spattering method and covers the upper surface of the resin member 93, the side surfaces of the resin members 93 to 95 and the module substrates 91 and 92. The shield electrode layer 96 is connected to the ground and inhibits an extraneous noise from being transmitted to the electronic components that are included in the radio frequency module 1A. The radio frequency module 1A does not necessarily need to include the shield electrode layer 96.

[2.1.2 Effects of Radio Frequency Module 1A]

The radio frequency module 1A in the present example includes the module substrate 91 that has the main surfaces 91a and 91b that face each other, the module substrate 92 that has the main surfaces 92a and 92b that face each other, the main surface 92a facing the main surface 91b, the multiple electronic components that are disposed between the main surfaces 91b and 92a, on or along the main surface 91a, and on or along the main surface 92b, and the multiple external connection terminals 150 that are disposed on or along the main surface 92b, the multiple electronic components include the power amplifier 11, the power amplifier 11 has the main surface 11a and the main surface 11b that face each other and includes the circuit portion that is formed nearer than the main surface 11b to the main surface 11a and that includes the amplifier transistor, as for the power amplifier 11, the main surface 11a faces the main surface 92a, the main surface 11b faces the main surface 91b, and the heat dissipation conductors 150t are joined to the main surface 11a as described above.

In this case, the multiple electronic components are disposed between the main surfaces 91b and 92a, on or along the main surface 91a, and on or along the main surface 92b so as to be divided into three layers, and accordingly, the area of the radio frequency module 1A in a plan view can be decreased, that is, the size of the radio frequency module 1A can be decreased. In addition, the power amplifier 11 is disposed between the main surfaces 91b and 92a. Accordingly, the heat dissipation conductors 150t that are connected to the motherboard 1000 can be shortened, and the heat dissipation is improved, unlike the case where the power amplifier 11 is disposed on or along the main surface 91a. In addition, the heat dissipation conductors 150t are joined to the main surface 11a near the circuit portion that is a heat source. Accordingly, the thermal resistance of a heat dissipation path can be reduced, and the heat dissipation is improved. In addition, the heat dissipation path of the power amplifier 11 is not located on or along the main surface 91a, and accordingly, the first electronic component can be disposed in a region on or along the main surface 91a that overlaps the power amplifier 11 in a plan view. For this reason, the size of the radio frequency module 1A can be decreased, and the heat dissipation of the power amplifier 11 can be improved.

For example, as for the radio frequency module 1A in the present example, the multiple electronic components may further include the first electronic component that is disposed on or along the main surface 91a, and the first electronic component and the power amplifier 11 at least partly overlap in a plan view of the module substrate 91.

In this case, the region on or along the main surface 91a that overlaps the power amplifier 11 can be used as a region in which the first electronic component is disposed, and the size of the radio frequency module 1A can be decreased.

For example, the radio frequency module 1A in the present example may have the bottom surface that faces the motherboard 1000, and as for each of the heat dissipation conductors 150t, an end may be joined to the main surface 11a, and another end may be exposed from the bottom surface described above.

In this case, the heat dissipation conductors 150t that are joined to the power amplifier 11 can be directly joined to the motherboard 1000, and the heat dissipation of the power amplifier 11 can be improved.

The communication device 5 in the present example includes the RFIC 3 that processes a radio frequency signal and the radio frequency module 1A that transmits the radio frequency signal between the RFIC 3 and the antenna 2.

This enables the communication device 5 to exert the effects of the radio frequency module 1A described above.

2.2 Second Example

A radio frequency module 1B that includes the radio frequency circuit 1 will now be described as a second example of the radio frequency circuit 1 according to the exemplary embodiment described above. The present example differs from the first example described above mainly in that a single module substrate is included. Difference between the radio frequency module 1B in the present example and the first example described above will be mainly described with reference to FIG. 6 to FIG. 9.

[2.2.1 Arrangement of Components of Radio Frequency Module 1B]

Figure 6:
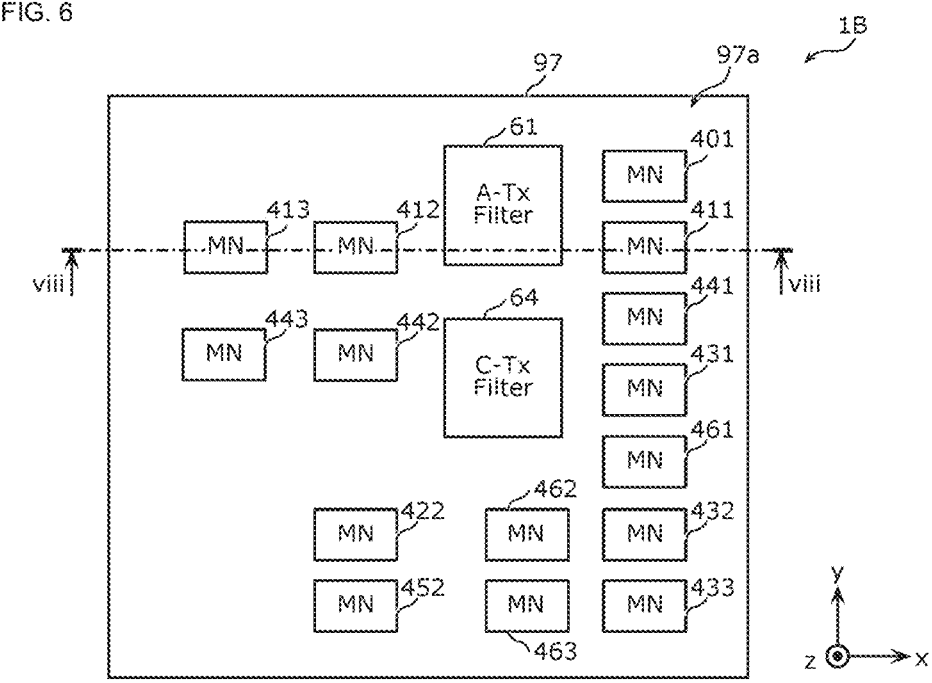
FIG. 6 is a plan view of a first main surface of a radio frequency module in a second example.
Figure 7:
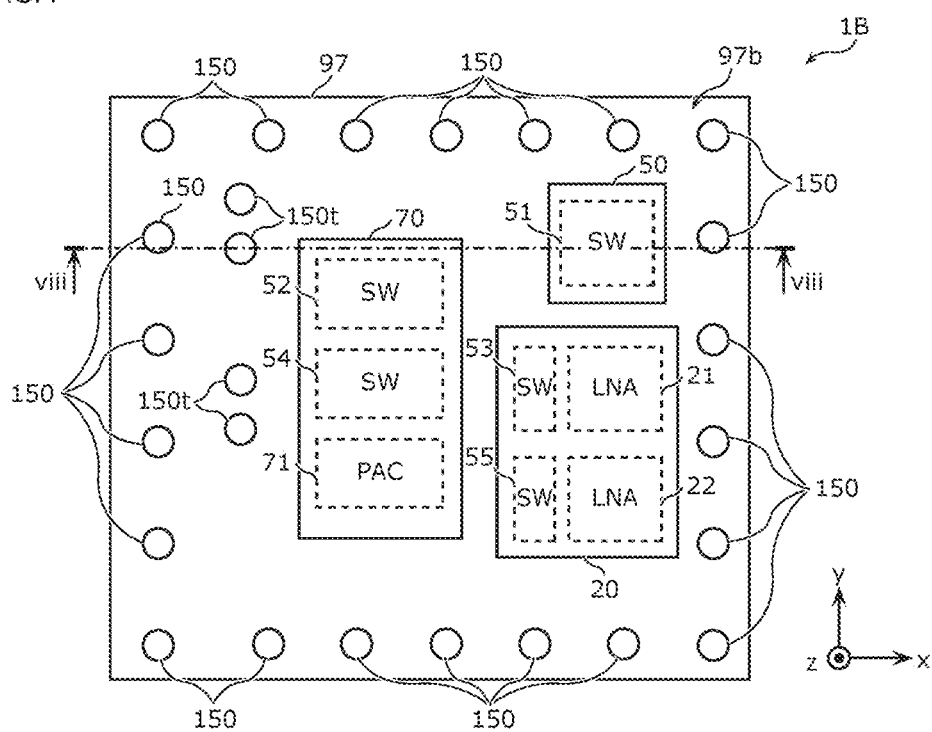
FIG. 7 is a plan view of a second main surface of the radio frequency module in the second example.
Figure 8:
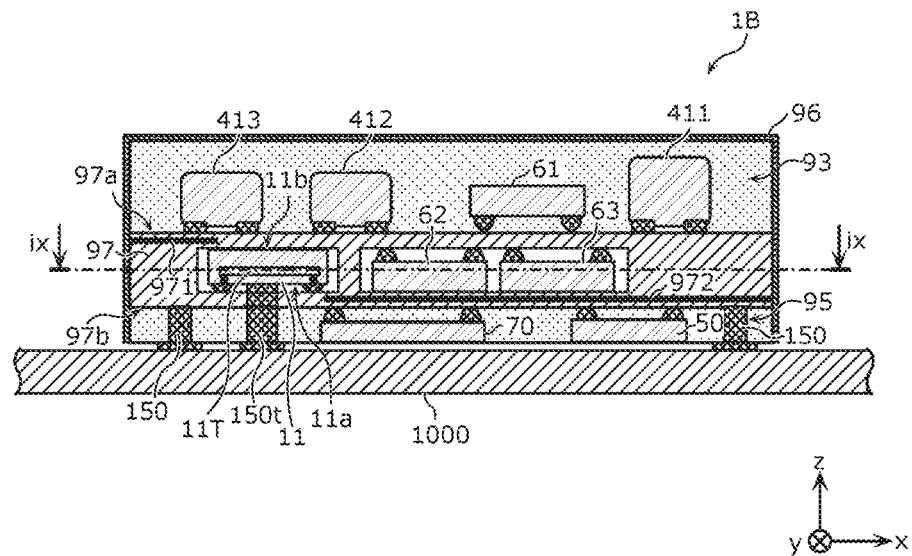
FIG. 8 is a sectional view of the radio frequency module in the second example.
Figure 9:
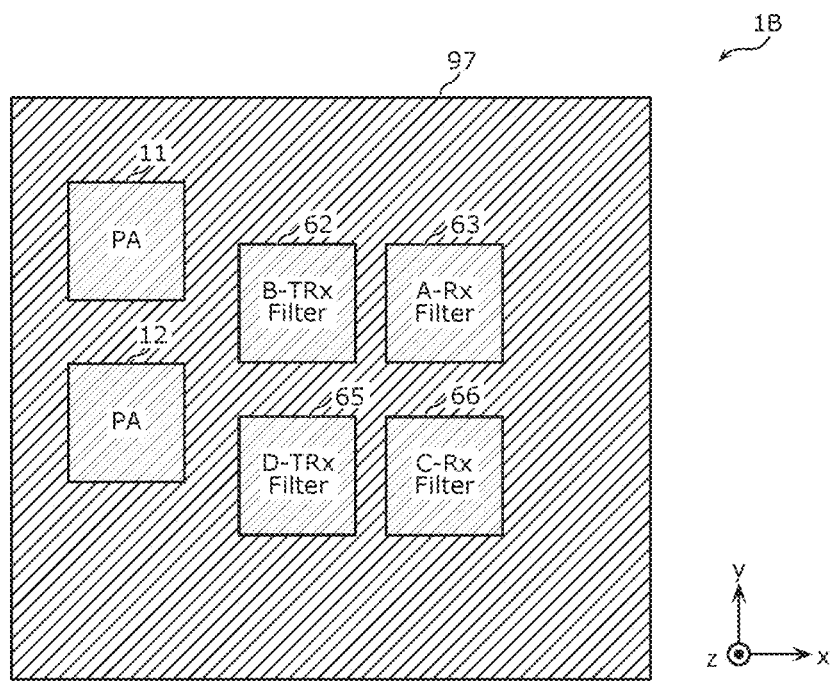
FIG. 9 is a sectional view of the radio frequency module in the second example.

FIG. 6 is a plan view of a main surface 97a of a radio frequency module 1B in the present example. FIG. 7 is a plan view of a main surface 97b of the radio frequency module 1B in the present example and illustrates the main surface 97b of a module substrate 97 viewed from a positive position on the z-axis. FIG. 8 is a sectional view of the radio frequency module 1B in the present example. A section of the radio frequency module 1B in FIG. 8 is a section taken along line viii-viii in FIG. 6 and FIG. 7. FIG. 9 is a sectional view of the radio frequency module 1B in the present example. A section of the radio frequency module 1B in FIG. 9 is a section taken along line ix-ix in FIG. 8.

In FIG. 6 to FIG. 9, an illustration for wiring lines that connect multiple electronic components that are disposed in, on, or along the module substrate 97 is omitted as in FIG. 2 to FIG. 5. In FIG. 6 and FIG. 7, an illustration for the resin members 93 and 95 that cover the multiple electronic components and the shield electrode layer 96 that covers the surfaces of the resin members 93 and 95 is omitted.

The radio frequency module 1B includes the module substrate 97, the resin members 93 and 95, the shield electrode layer 96, the multiple heat dissipation conductors 150t, and the multiple external connection terminals 150 in addition to multiple electronic components that include multiple circuit elements illustrated in FIG. 1.

The module substrate 97 has the main surfaces 97a and 97b that face each other. The main surfaces 97a and 97b are examples of the first main surface and the second main surface. Examples of the module substrate 97 can include a LTCC substrate, a HTCC substrate, a component-containing substrate, a substrate that includes a RDL, and a printed circuit board but are not limited thereto.

Ground conductors 971 and 972 that extend in parallel with the main surfaces 97a and 97b may be formed in the module substrate 97. This improves isolation between an electronic component that is disposed on or along the main surface 97a and an electronic component that is disposed on or along the main surface 97b.

The matching circuits 401, 411 to 413, 422, 431 to 433, 441 to 443, 452, and 461 to 463 and the filters 61 and 64 are disposed on or along the main surface 97a (the upper layer).

For example, the matching circuits 401, 411 to 413, 422, 431 to 433, 441 to 443, 452, and 461 to 463 include respective chip inductors. Each chip inductor is a SMD that is included in an inductor. The chip inductor is disposed on or along the main surface 97a. The matching circuits may include respective chip capacitors in addition to the chip inductors. The arrangement of the chip capacitors is not particularly limited. Some of the matching circuits are not necessarily surface mount circuits. For example, an inductor and/or a capacitor in a matching circuit may be formed in the module substrate 97.

Examples of the filters 61 and 64 may include a SAW filter, a BAW filter, a LC resonance filter, and a dielectric filter but are not limited thereto.

The resin member 93 covers the main surface 97a and electronic components on or along the main surface 97a. The resin member 93 has a function of ensuring the reliability of, for example, the mechanical strength and humidity resistance of the electronic components on or along the main surface 97a. The radio frequency module 1B does not necessarily need to include the resin member 93.

The power amplifiers 11 and 12, the filters 62, 63, 65, and 66, and the multiple heat dissipation conductors 150t are disposed in the module substrate 97 (the intermediate layer).

The power amplifiers 11 and 12 include the respective amplifier transistors. The amplifier transistor of the power amplifier 11 is formed at the circuit portion 11T. As illustrated in FIG. 8, the circuit portion 11T is formed near the main surface 11a of the main surface 11a (the third main surface) and the main surface 11b (the fourth main surface) of the power amplifier 11 that face each other. As for the power amplifier 11, the main surface 11a is nearer than the main surface 97a to the main surface 97b. Similarly, the amplifier transistor that is included in the power amplifier 12 is formed at the circuit portion 12T. The circuit portion 12T is formed near the main surface 12a of the main surface 12a (the third main surface) and the main surface 12b (the fourth main surface) of the power amplifier 12 that face each other although this is not illustrated. As for the power amplifier 12, the main surface 12a is nearer than the main surface 97a to the main surface 97b.

Examples of the filters 62, 63, 65, and 66 may include a SAW filter, a BAW filter, a LC resonance filter, and a dielectric filter but are not limited thereto.

In a plan view of the module substrate 97, the matching circuit 413 (the first electronic component) and the power amplifier 11 at least partly overlap. The matching circuit 443 (the first electronic component) and the power amplifier 12 at least partly overlap. This enables transmission paths at the exits of the power amplifiers 11 and 12 to be shortened. In the plan view described above, the first electronic component that at least partly overlaps the power amplifier 11 or 12 may be any one of the multiple electronic components that are disposed on or along the main surface 97a.

The integrated circuits 20, 50, and 70, the multiple external connection terminals 150, and the multiple heat dissipation conductors 150t are disposed on or along the main surface 97b (the lower layer).

The multiple heat dissipation conductors 150t overlap the power amplifiers 11 and 12 in a plan view and function as the heat dissipation electrodes of the power amplifiers 11 and 12. More specifically, as for each of the multiple heat dissipation conductors 150t, as illustrated in FIG. 7 and FIG. 8, an end is joined to the main surface 11a of the power amplifier 11 or the main surface 12a of the power amplifier 12 and extends in a direction toward the main surface 97b from the main surface 97a (the negative direction of the z-axis), and anther end is exposed from the bottom surface of the resin member 95 and is joined to the motherboard 1000 with at least a metal electrode or solder interposed therebetween. This enables the heat dissipation of the power amplifiers 11 and 12 to be improved. Examples of the heat dissipation conductors 150t include a via conductor that has a circular or elliptic section parallel with the module substrate 91 and a copper post electrode, but shapes and materials are not limited thereto.

The integrated circuit 20 includes the low-noise amplifiers 21 and 22 and the switches 53 and 55. Circuit elements that are included in the low-noise amplifiers 21 and 22 and the switches 53 and 55 are formed on or along the circuit surface of the integrated circuit 20. An example of the circuit surface is a main surface of the integrated circuit 20 that faces the module substrate 97. The integrated circuit 70 includes the switches 52 and 54 and the PA controller 71. Circuit elements that are included in the switches 52 and 54 and the PA controller 71 are formed on or along the circuit surface of the integrated circuit 70. An example of the circuit surface is a main surface of the integrated circuit 70 that faces the module substrate 97. The integrated circuit 50 includes the switch 51. The switch 51 may be included in the integrated circuit 20 or 70

The multiple external connection terminals 150 include the ground terminal in addition to the antenna connection terminal 100, the radio frequency input terminals 111 and 112, the radio frequency output terminals 121 and 122, and the control terminal 131 illustrated in FIG. 1. The multiple external connection terminals 150 are joined to, for example, input and output terminals and/or a ground terminal on or along the motherboard 1000 that is disposed at a negative position on the z-axis of the radio frequency module 1B.

The resin member 95 covers the main surface 97b and the electronic components on or along the main surface 97b. The resin member 95 has a function of ensuring the reliability of, for example, the mechanical strength and humidity resistance of the electronic components on or along the main surface 97b. The radio frequency module 1B does not necessarily need to include the resin member 95.

As for the radio frequency module 1B in the present example, the integrated circuit 70 may be disposed on or along the main surface 97a, the power amplifier 11 may be disposed in the module substrate 97, and in a plan view of the module substrate 97, the PA controller 71 and the power amplifier 11 may at least partly overlap.

[2.2.2 Effects of Radio Frequency Module 1B]

The radio frequency module 1B in the present example includes the module substrate 97 that has the main surfaces 97a and 97b that face each other, the multiple electronic components that are disposed on or along the main surface 97a and the main surface 97b, the multiple external connection terminals 150 that are disposed on or along the main surface 97b, and the power amplifier 11 that is disposed in the module substrate 97, the power amplifier 11 has the main surfaces 11a and 11b that face each other and includes the circuit portion that is formed nearer than the main surface 11b to the main surface 11a and that includes the amplifier transistor, as for the power amplifier 11, the main surface 11a is nearer than the main surface 11b to the main surface 97b, and the heat dissipation conductors 150t are joined to the main surface 11a as described above.

In this case, the multiple electronic components are disposed on or along the main surface 97a and the main surface 97b, and the power amplifier 11 is disposed in the module substrate 97. Accordingly, the area of the radio frequency module 1B in a plan view can be decreased, that is, the size of the radio frequency module 1B can be decreased. In addition, the power amplifier 11 is disposed in the module substrate 97. Accordingly, the heat dissipation conductors that are connected to the motherboard 1000 can be shortened, and the heat dissipation is improved, unlike the case where the power amplifier 11 is disposed on or along the main surface 97a. In addition, the heat dissipation conductors 150t are joined to the main surface 11a near the circuit portion that is a heat source. Accordingly, the thermal resistance of the heat dissipation path can be reduced, and the heat dissipation is improved. In addition, the heat dissipation path of the power amplifier 11 is not located on or along the main surface 97a, and accordingly, the first electronic component can be disposed in a region on or along the main surface 97a that overlaps the power amplifier 11 in a plan view. For this reason, the size of the radio frequency module 1B can be decreased, and the heat dissipation of the power amplifier 11 can be improved.

For example, as for the radio frequency module 1B in the present example, the multiple electronic components may further include the first electronic component that is disposed on or along the main surface 97a, and the first electronic component and the power amplifier 11 may at least partly overlap in a plan view of the module substrate 97.

In this case, the region on or along the main surface 97a that overlaps the power amplifier 11 can be used as a region in which the first electronic component is disposed, and the size of the radio frequency module 1B can be decreased.

For example, the radio frequency module 1B in the present example may have the bottom surface that faces the motherboard 1000, and as for each of the heat dissipation conductors 150t, an end may be joined to the main surface 11a, and another end may be exposed from the bottom surface described above.

In this case, the heat dissipation conductors 150t that are joined to the power amplifier 11 can be directly joined to the motherboard 1000, and the heat dissipation of the power amplifier 11 can be improved.

The communication device 5 in the present example includes the RFIC 3 that processes a radio frequency signal and the radio frequency module 1B that transmits the radio frequency signal between the RFIC 3 and the antenna 2.

This enables the communication device 5 to exert the effects of the radio frequency module 1B described above.

(Modification)

The radio frequency module and the communication device according to the present disclosure are described above based on the exemplary embodiment and the examples. The radio frequency module and the communication device according to the present disclosure are not limited to the exemplary embodiment and the examples described above. The present disclosure includes another example in which freely selected components in the examples described above are combined, modifications that are acquired by modifying the exemplary embodiment described above and the examples described above in various ways by a person skilled in the art without departing from the spirit of the present disclosure, and various devices that contain the radio frequency module described above.

For example, in the circuit structures of the radio frequency circuit and the communication device according to the exemplary embodiment described above, another circuit element and another wiring line may be interposed between paths that connect signal paths and the circuit elements illustrated in the figures. For example, a matching circuit may be interposed between the switch 51 and the filter 62, and/or between the switch 51 and the filter 65.

The arrangement of the multiple electronic components in the above examples is described above by way of example and is not limited to the above examples. For example, the position of a freely selected electronic component in a freely selected one of the examples may be replaced with the position of the electronic component in another example.

In the examples described above, the multiple external connection terminals 150 are copper post electrodes but are not limited thereto. For example, the multiple external connection terminals 150 may be bump electrodes. In this case, the radio frequency module does not necessarily need to include the resin member 95.

INDUSTRIAL APPLICABILITY

The present disclosure can be widely used as a radio frequency module that is disposed at a front end portion for a communication device such as a cellular phone.

REFERENCE SIGNS LIST 1 radio frequency circuit
1A, 1B radio frequency module
2 antenna
3 RFIC
4 BBIC
5 communication device
11, 12 power amplifier
11a, 11b, 12a, 12b, 91a, 91b, 92a, 92b, 97a, 97b main surface
11T, 12T circuit portion
20, 50, 70 integrated circuit
21, 22 low-noise amplifier
51, 52, 53, 54, 55 switch
61, 62, 63, 64, 65, 66 filter
71 PA controller
91, 92, 97 module substrate
93, 94, 95 resin member
96 shield electrode layer
100 antenna connection terminal
111, 112 radio frequency input terminal
121, 122 radio frequency output terminal
131 control terminal
150 external connection terminal
150t heat dissipation conductor
151 inter-substrate connection terminal
401, 411, 412, 413, 422, 431, 432, 433, 441, 442, 443, 452, 461, 462, 463 matching circuit
511, 512, 513, 514, 515, 516, 517, 521, 522, 523, 524, 531, 532, 533, 541, 542, 543, 544, 551, 552, 553 terminal
911, 921, 971, 972 ground conductor
1000 motherboard

The invention claimed is:

1. A radio frequency module comprising:
a first module substrate that has a first main surface facing a second main surface;
a second module substrate that has a third main surface facing a fourth main surface, the third main surface facing the second main surface;
multiple electronic components that are disposed between the second main surface and the third main surface, on the first main surface, and on the fourth main surface; and
multiple external connection terminals that are disposed on the fourth main surface,
wherein the multiple electronic components include a power amplifier,
wherein the power amplifier has a fifth main surface facing a sixth main surface and includes a circuit portion that is formed nearer to the fifth main surface than the sixth main surface and that includes an amplifier transistor,
wherein in the power amplifier, the fifth main surface faces the third main surface, and the sixth main surface faces the second main surface, and
wherein a heat dissipation conductor is joined to the fifth main surface.

2. The radio frequency module according to claim 1,
wherein the multiple electronic components further include a first electronic component that is disposed on the first main surface, and
wherein the first electronic component and the power amplifier at least partly overlap in a plan view of the first module substrate.

3. The radio frequency module according to claim 1,
wherein the radio frequency module has a bottom surface that faces an external substrate, and
wherein the heat dissipation conductor includes an end joined to the fifth main surface, and another end exposed from the bottom surface.

4. A radio frequency module comprising:
a module substrate that has a first main surface facing a second main surface;
multiple electronic components that are disposed on the first main surface and the second main surface;
multiple external connection terminals that are disposed on the second main surface; and
a power amplifier that is disposed in the module substrate,
wherein the power amplifier has a third main surface facing a fourth main surface and includes a circuit portion that is formed nearer to the third main surface than the fourth main surface and that includes an amplifier transistor, and
wherein in for the power amplifier, the third main surface is nearer to the second main surface than the fourth main surface, and
wherein a heat dissipation conductor is joined to the third main surface.

5. The radio frequency module according to claim 4,
wherein the multiple electronic components further include a first electronic component that is disposed on the first main surface, and
wherein the first electronic component and the power amplifier at least partly overlap in a plan view of the module substrate.

6. The radio frequency module according to claim 4,
wherein the radio frequency module has a bottom surface that faces an external substrate, and
wherein the heat dissipation conductor includes an end joined to the third main surface, and another end exposed from the bottom surface.

7. A communication device comprising:
a signal processing circuit that processes a radio frequency signal; and
the radio frequency module according to claim 1 that transmits the radio frequency signal between the signal processing circuit and an antenna.

8. The radio frequency module according to claim 1, wherein the amplifier transistor is one of a complementary metal oxide semiconductor (CMOS) transistor, a gallium arsenide (GaAs) transistor, a silicon germanium (SiGe) transistor, and a gallium nitride (GaN) transistor.

9. The radio frequency module according to claim 1, wherein at least one of the first module substrate and the second module substrate includes a high temperature co-fired ceramic (HTCC), a low temperature co-fired ceramic (LTCC), and a printed circuit board.

10. The radio frequency module according to claim 9, wherein at least one of the first module substrate and the second module substrate is formed of a multi-layer structure.

11. The radio frequency module according to claim 10, wherein the multi-layer structure includes a redistribution layer (RDL).

12. The radio frequency module according to claim 1, further comprising:
a matching circuit connected to the power amplifier; and
a filter circuit connected between the matching circuit and at least one of the external connection terminals.

13. The radio frequency module according to claim 12, wherein the matching circuit includes a surface mount chip inductor.

14. The radio frequency module according to claim 13, wherein the matching circuit further includes a chip capacitor.

15. The radio frequency module according to claim 12, wherein the filter circuit includes a surface acoustic wave (SAW) filter.

16. The radio frequency module according to claim 12, wherein the filter circuit includes a bulk acoustic wave (BAW) filter.

17. The radio frequency module according to claim 12, wherein the filter circuit is one of a inductive-capacitive (LC) resonant filter and a dielectric filter.

18. The radio frequency module according to claim 1, further comprising:
a resin member to cover at least the first main surface.

19. The radio frequency module according to claim 1, wherein the multiple external connection terminals include copper post electrodes.

* * * * *